Nov. 3, 1964   C. R. WARD   3,155,484
APPARATUS FOR DRAWING SHEET GLASS
Filed Nov. 2, 1959   5 Sheets-Sheet 4

INVENTOR.
CECIL R. WARD
BY Oscar L. Spencer
ATTORNEY

Nov. 3, 1964  C. R. WARD  3,155,484
APPARATUS FOR DRAWING SHEET GLASS
Filed Nov. 2, 1959  5 Sheets-Sheet 5
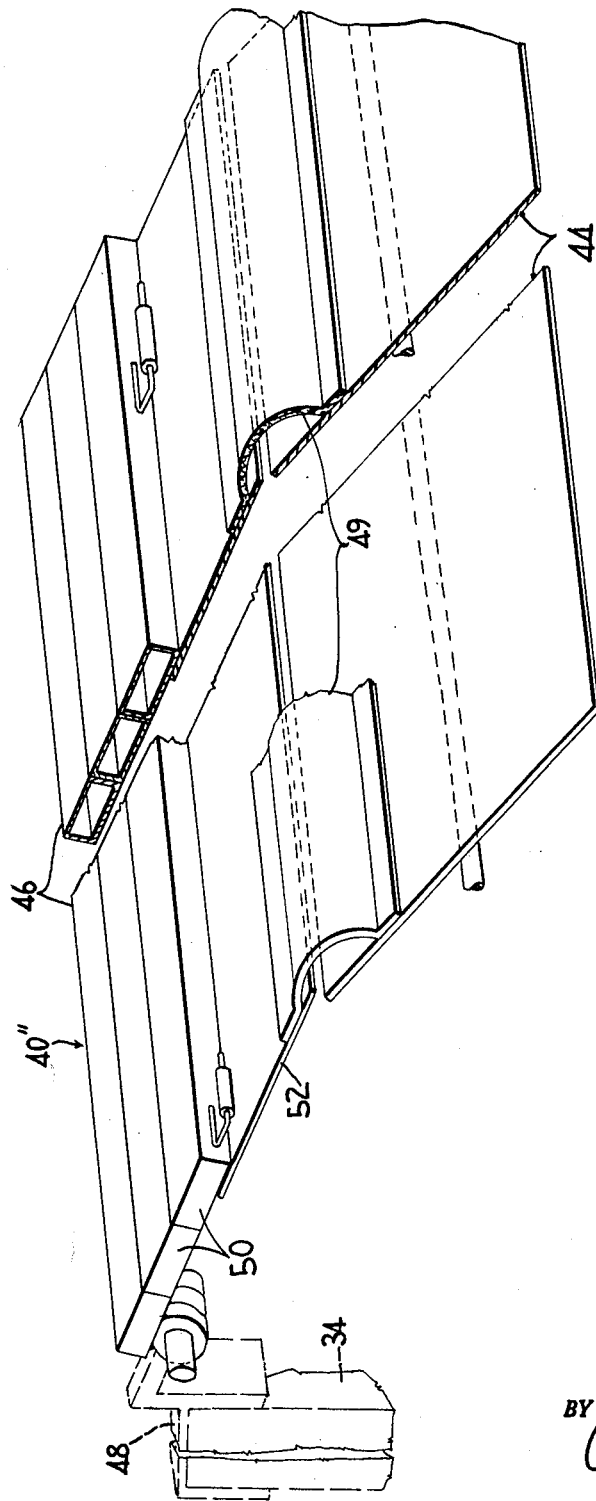
INVENTOR.
CECIL R. WARD
BY Oscar L. Spencer
ATTORNEY United States Patent Office 3,155,484
Patented Nov. 3, 1964

3,155,484
APPARATUS FOR DRAWING SHEET GLASS
Cecil R. Ward, Gibsonia, Pa., assignor to Pittsburgh Plate Glass Company, a corporation of Pennsylvania
Filed Nov. 2, 1959, Ser. No. 850,315
5 Claims. (Cl. 65—203)

This invention relates to the manufacture of sheet glass by conutinuous drawing from a bath of molten glass and provides improved methods and apparatus for producing drawn sheet glass of improved appearance wherein the usual characteristic wave pattern, i.e., transverse thickness variations which appear as bands or ribs, extending generally in the direction of the draw, is eliminated or materially reduced.

These characteristic wave patterns occur primarily because of non-uniform cooling of the sheet across its width. To provide uniform cooling of the sheet, it is desirable to allow the heat loss to take place substantially entirely by radiation rather than by a transfer to convections currents or a combination of radiation and a transfer to convection currents.

In conventional process of drawing sheet glass, a natural stack is induced by the geometry of the sheet, bath and drawing chamber wherein there is a transfer of heat from the bath and sheet at relatively elevated temperatures to the cooler ambient air within the chamber producing a convection flow of air in the direction of the draw and out of the chamber. The movement of heated air in the direction of the draw results in zones of reduced pressure at the base or meniscus of the sheet, so that cold-air is drawn to the reduced pressure zones. Air enters the drawing chamber at the juncture of the chamber and the drawing machine and leaks into the chamber from cracks, crevices, or the like in the chamber walls. Colder air flowing to the zones of low pressure is chilled by moving generally across coolers, which are disposed within the chamber slightly above the surface of the bath and on opposite sides of the sheet to accelerate the setting of the glass. As readily understood, the temperature of entering air will be non-uniform because of differences in temperature of the sources of this air and this condition will persist due to differences in paths taken by this air in the drawing chamber, and, also, due to conditions within the kiln. These temperature differences cause non-uniform velocities within the drawing chamber. The colder air of non-uniform velocities flows to the reduced pressure zones and disturbs the relatively thin surface adhering film moving with the glass causing non-uniform heat transfer across the sheet, thereby affecting the formation of the glass in the area where the glass undergoes the transition from fluid to solid state. Being in the plastic state and under stress, the glass is unequally attenuated to form a characteristic wave pattern.

Another characteristic wave pattern extends diagonally and usually exists on the outer margins of the sheet. This diagonal wave pattern may be so severe, in some instances, as to extend entirely across the sheet. The diagonal wave pattern, when superimposed on a longitudinal wave pattern provides a pattern referred to in the sheet glass industry as "batter" or "dapple," and is the result of colder air flowing from the vicinity of the ends of the coolers and the ends of the drawing chamber to the zones of low pressure at the base of the sheet. These currents of air are commonly referred to as "end-around currents."

Many arrangements have been proposed to improve the appearance of drawn sheet glass. One such arrangement is taught by Brichard in United States Patent No. 2,693,052, wherein burners or suction means are disposed just above the surface of the bath to eliminate flow of relatively cold air to the base of the glass sheet in the direction of the draw. Thus, either no air flow takes place along the sheet or else such air flow as takes place moves along the sheet in a direction opposite to that of the draw.

Other arrangements to improve the appearance of drawn sheet glass have been proposed in the application for United States Letters Patent of Robert A. James and Cecil R. Ward, Serial No. 771,393, filed November 3, 1958, entitled "Manufacture of Glass." In this application, instead of eliminating the flow of air to the base of the sheet, as disclosed by the aforesaid Brichard, the flow of air to and from the base of the sheet is controlled or regulated, so as to be diminished but not eliminated, thus the flow of air along the sheet in the direction of the draw is reduced but not eliminated. The flow of air in the direction of the draw forms an undisrupted unidirectional protective layer or envelope surrounding the sheet and moving at a velocity sufficiently low so that it does not disturb the relatively thin insulating surface adhering film of air surrounding the sheet, with a material reduction in attenuation variations, thus providing an improvement in the appearance of the sheet.

The provision of a protective envelope of air moving at a sufficiently low velocity in the direction of the draw results in minimizing cooling of the glass sheet by heat transfer through convection currents and thereby allows more uniform cooling of the sheet by radiation to the usual coolers spaced from the sheet and located slightly above the surface of the bath. The end-around currents are also reduced an/or rendered ineffective, so that the usual diagonal wave pattern is eliminated.

The various arrangements disclosed and claimed in the aforesaid James and Ward application for improving the appearance of drawn sheet glass include the use of means that serve as barriers, diverters, or isolaters, or various combinations of these means so located and positioned within a drawing chamber or supported adjacent to components defining the chamber as to reduce the flow, i.e., quantity and velocity, of air to and from the base of a glass sheet as it is being drawn and to control the flow along the sheet to minimize non-uniformities in heat transfer from the sheet along its path of movement in the kiln.

In the aforesaid James and Ward application, burners are used in the drawing chamber to provide a flow of air in cyclic paths spaced from the glass sheet and the coolers, these burners creating zones of low pressure adjacent their locations. The use of these burners as well as the other devices therein disclosed and claimed are effective to improve the appearance of the drawn sheet glass. With the various devices and especially the burners installed, the drawing chamber is characterized by air flow in closed cyclic paths behind the coolers and adjacent the burners and also by nondirectional air currents which flow generally toward the burners because of the low presure zones created thereby. In the cyclic paths, the magnitude of the relative velocities of the components of air are constantly in flux.

Initially, the burners are so adjusted that their flames provide a balance between air flowing to the low pressure zones from the sheet and air, being caused to flow into the cyclic paths. However, because of the changing magnitudes in the velocity of the air flowing within the cyclic paths, this air impinges on the burner flames generally normal to their direction of propagation and causes the flames to fluctuate in their direction with a resultant fluctuation in the shape of the cyclic paths. Such fluctuations affect the balance established initially by the adjustment of the burners and the direction of flame propagation. Thus, the fluctuations are such that they can affect the air flowing to the base of the sheet, which air affects the appearance of the sheet and lowers its pattern reading.

In addition to the air flowing in the cyclic paths, there is the air flowing in generaly nondirectional paths generally toward and into the low pressure zones created by the burners. These currents of air do nothing to enhance the desired cyclic flow of air. Thus, in an attempt to maintain the desired balance of air flow periodic changes are made in the burner "settings," i.e., the direction of flame propagation and relative intensity are periodically changed; however, it is to be remembered that the initial setting is that for optimum results. Changing of the burner settings is not effective to overcome the flluctuations which are generally of short but frequent duration. Thus, the pattern or appearance of the glass periodically and frequently varies as compared to that desired and obtained under optimum conditions.

It has been found that the appearance of the sheet glass may be further improved and the stability of the drawing operation improved by controlling the flow of air in the cyclic path adjacent the burner flames and the non-directional air currents which flow generally toward the burners. This control is provided by impeding the flow of air in the cyclic path adjacent the burner, so that it does not disturb the burner flames and giving directionality to the other air which flows in generally non-directional paths generally toward the low pressure areas created by the burners. Thus the periodic changes in the burner "settings" is substantially eliminated and the desired balance of air currents is maintained substantially constant.

Other features and advantages will become apparent from the following description and accompanying drawings which illustrate various embodiments of the invention and in which:

FIG. 5 is a partial perspective view of the chimney plate arrangement of FIG. 4 with parts in section.

Figure 1:
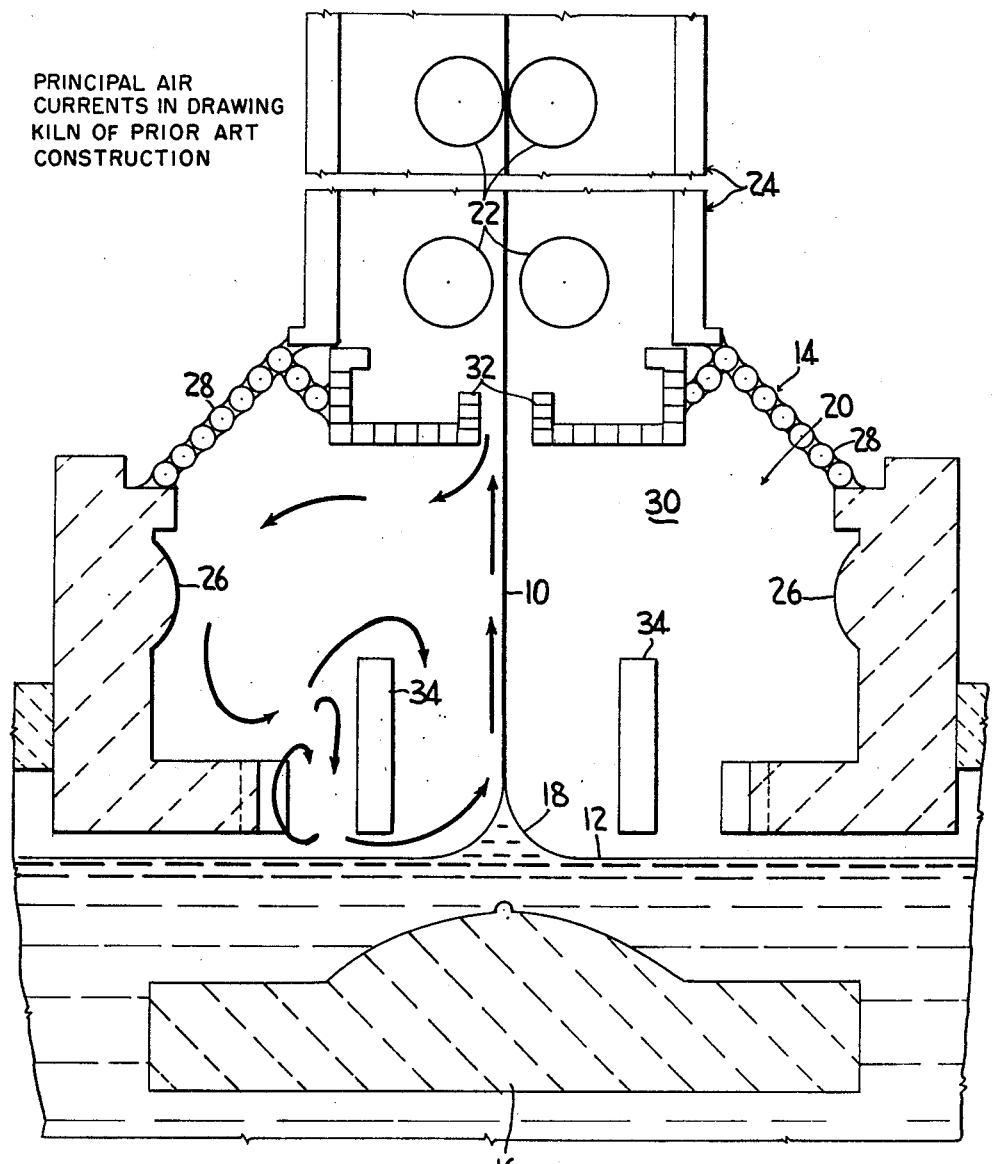
FIG. 1 shows diagrammatically a drawing kiln of conventional, prior art construction and the flow of principal air currents therein.

Turning to the drawings wherein like parts are identified with like reference characters, there is shown in FIGS. 1, 2, 3 and 4, a sheet of glass 10 being drawn from a bath 12 of molten glass in a drawing kiln generally indicated at 14 (only parts of which are shown but which is a conventional construction). A draw bar 16 extending transversely of the kiln 14 is submerged in bath 12. The glass sheet 10 in its viscous condition forms a base or meniscus 18 with the surface of the bath 12, and the sheet 10 is drawn from the bath 12 and through the drawing chamber 20 of the kiln 14 by means of drawing rolls 22 of a conventional drawing machine generally indicated at 24. The drawing chamber 20, as depicted in the drawings, is defined by bath 12 and conventional L-blocks 26, ventilator water coolers 28, end walls 30 and catch pans 32. The ventilator coolers 28 are each positioned between an L-block 26 and the base framework of the drawing machine 24 and extend substantially to the end walls 30 of the kiln 14. The base of the drawing machine 24 is substantially closed by means of the generally U-shaped catch pans 32, which are formed as coolers and are positioned so as to catch broken glass which may drop in the machine and thus prevent entry of fragments into the bath 12. These catch pans 32 also extends substantially to the end walls 30 of the kiln 14 and are constructed for the passage of cooling fluid, such as water. One leg of each catch pan 32 is disposed substantially parallel to and spaced from the sheet 10. Water coolers 34 of conventional construction (see FIG. 1) or water coolers 34' of a construction described and claimed in copending applications for United States Letters Patents of Cecil R. Ward, Serial Nos. 807,915 and 828,836, filed April 21, 1959, and July 22, 1959, respectively, both entitled "Heat Exchange Apparatus," are provided for cooling sheet 10 by absorbing radiation from the sheet 10. The coolers 34 or 34' are spaced above the surface of the bath and are positioned on opposite sides of the sheet 10 to extend substantially the width of the sheet.

So much of the apparatus as has been just described with the exception of the coolers 34' is common to the prior art and the instant invention and constitutes a normal or usual sheet glass drawing apparatus set up.

Figure 2:
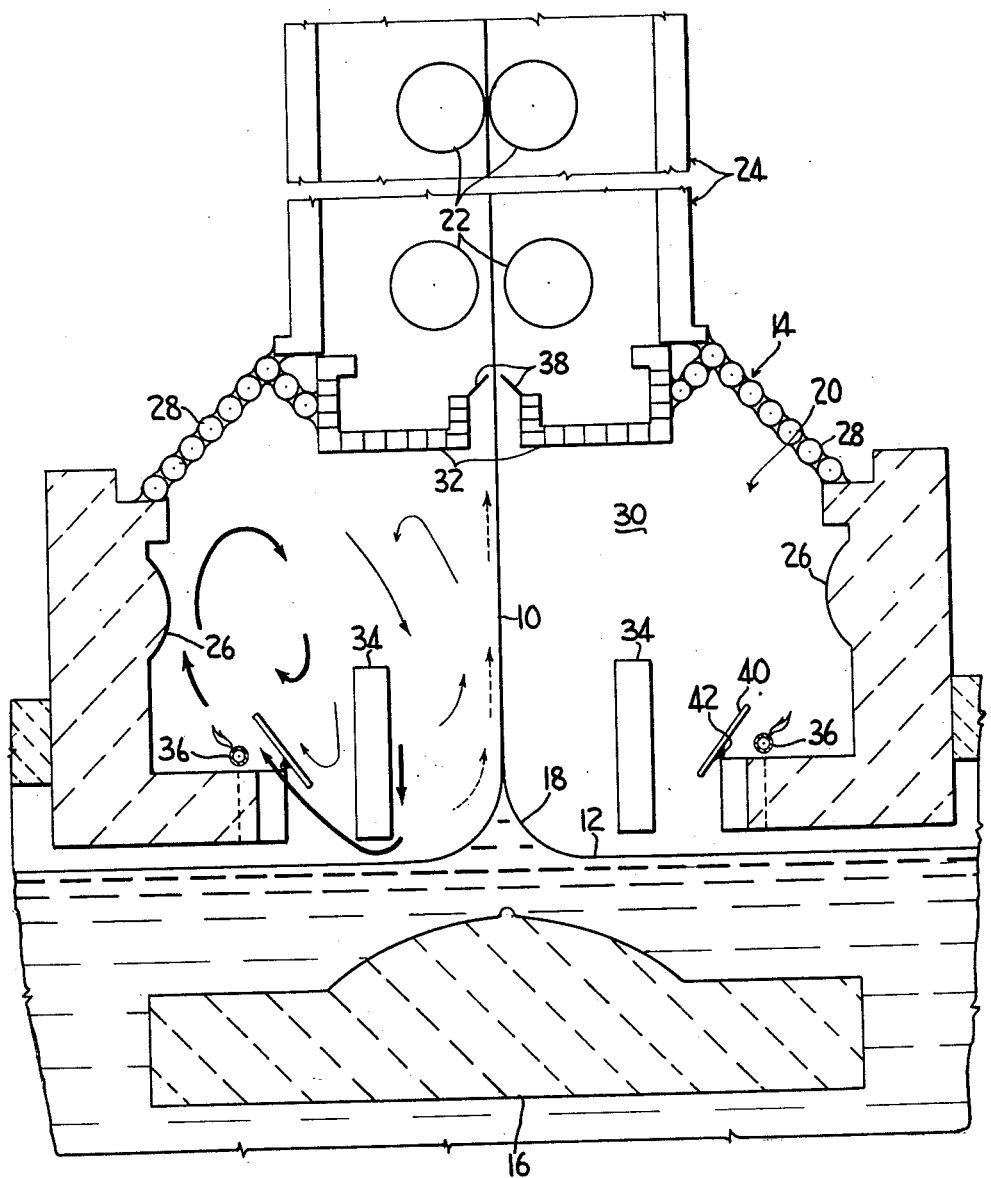
FIG. 2 shows diagrammatically a preferred embodiment of a drawing kiln according to this invention and the flow of principal air currents therein.

Reference is now made to FIG. 2 illustrating a preferred embodiment of this invention wherein, in addition to the conventional apparatus elements in their usual structural relationship, there are burners 36 and adjustable dampers 38 on each side of sheet 10 and disposed between the catch pans 32 and the first pair of rolls 22 of the drawing machine 24. Dampers 38 extend substantially the width of drawing machine 24. The burners 36 extend transversely of the chamber 20 for at least the width of the sheet 10. In addition to the burners 36 and the dampers 38, which are the same as described in the James and Ward application, there are adjustable chimney plates 40 positioned in proximity to the burners 36 and spaced from the sheet 10 and the coolers 34. These chimney plates 40 are constructed of heat resistant metal plates and provide the previously generally described control of air flow in the cyclic path set up by the burners and also give directionality to air flowing toward the low pressure zones created by the burners. As illustrated in the FIG. 2 embodiment, the plates 40 are located at the lip of the L-blocks 26 and are constructed for limited rotation about an axis aligned with the L-block lip.

The plates 40 extend from just below the effective portion of each burner 36 to just above the effective portion of each burner 36. The effective portion of each burner is that region of low pressure created by the rising hot gas of the burner. The axis about which the plate 40 is rotatable is defined by a rod 42 which passes from side to side of the chamber 20 and through the end walls 30. The plates 40 extend substantially the width of the chamber 20.

The burners 36 are pipes, each having closely spaced holes through which combustible fluid can escape, preferably normal to the longitudinal axis of pipe 36. Upon combustion the gaseous products form a substantially continuous sheet of heated gases extending across the chamber 20. The burners 36 are illustrated as having their flames directed upwardly at an inclined angle generally in the direction of the draw of the sheet 10. The burners 36 have their flames directed generally upwardly and angularly toward the L-blocks 26. The burners 36 are so constructed as to be rotatable to vary the inclined angle of the flames. The dampers 38 are constructed so as to be adjustable to vary their angular disposition and their upward disposition and by adjustment can be spaced from or wipe against the rolls 18.

Figure 3:
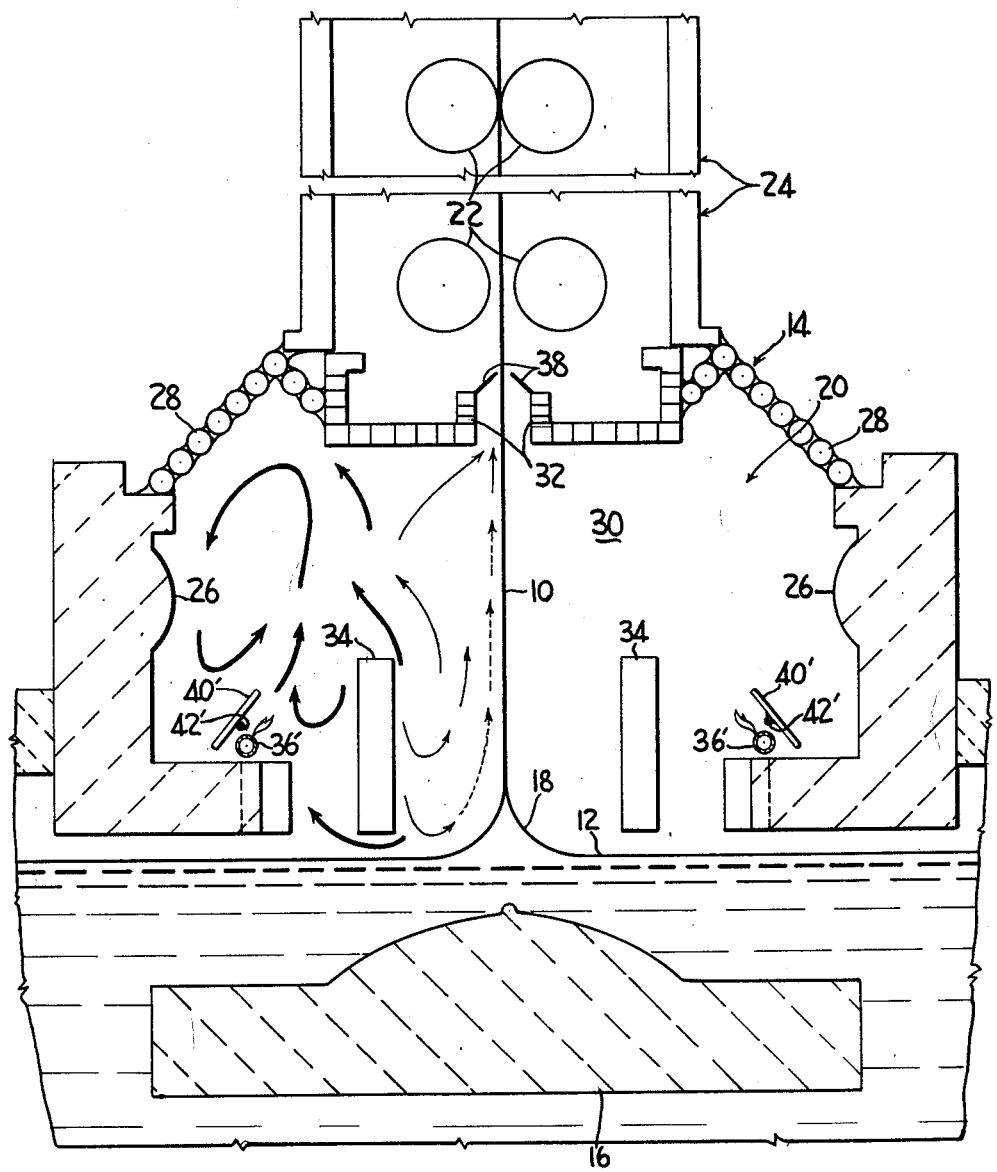
FIG. 3 shows diagrammatically another embodiment of a drawing kiln according to this invention and the flow of principal air currents therein.

Reference is now made to FIG. 3 illustrating a second embodiment of this invention which differs from the embodiment illustrated in FIG. 2 in the location and inclination of the chimney plates, identified here as 40' and the burners identified here as 36'.

In this embodiment the burners 36' are adjusted so that their flames are directed generally upwardly and angularly toward the sheet 10, but still generally in the direction of the draw of the glass sheet. The chimney plates 40' are thus positioned between the burners 36' and the L-blocks 26 and are spaced from the horizontal legs of the L-blocks. The plates 40', which extend substantially the width of the drawing chamber 20 are supported by a medial rod or the like 42' welded or otherwise secured to the plate and extending through suitable openings on the end walls 30 of the kiln 14. The rods 42' serve as a means for adjusting the angularity of the plates 40'. The plates 40' like the plates 40 extend from below the effective portion of each burner 36' to just above the effective portion of each burner 36'.

Figure 4:
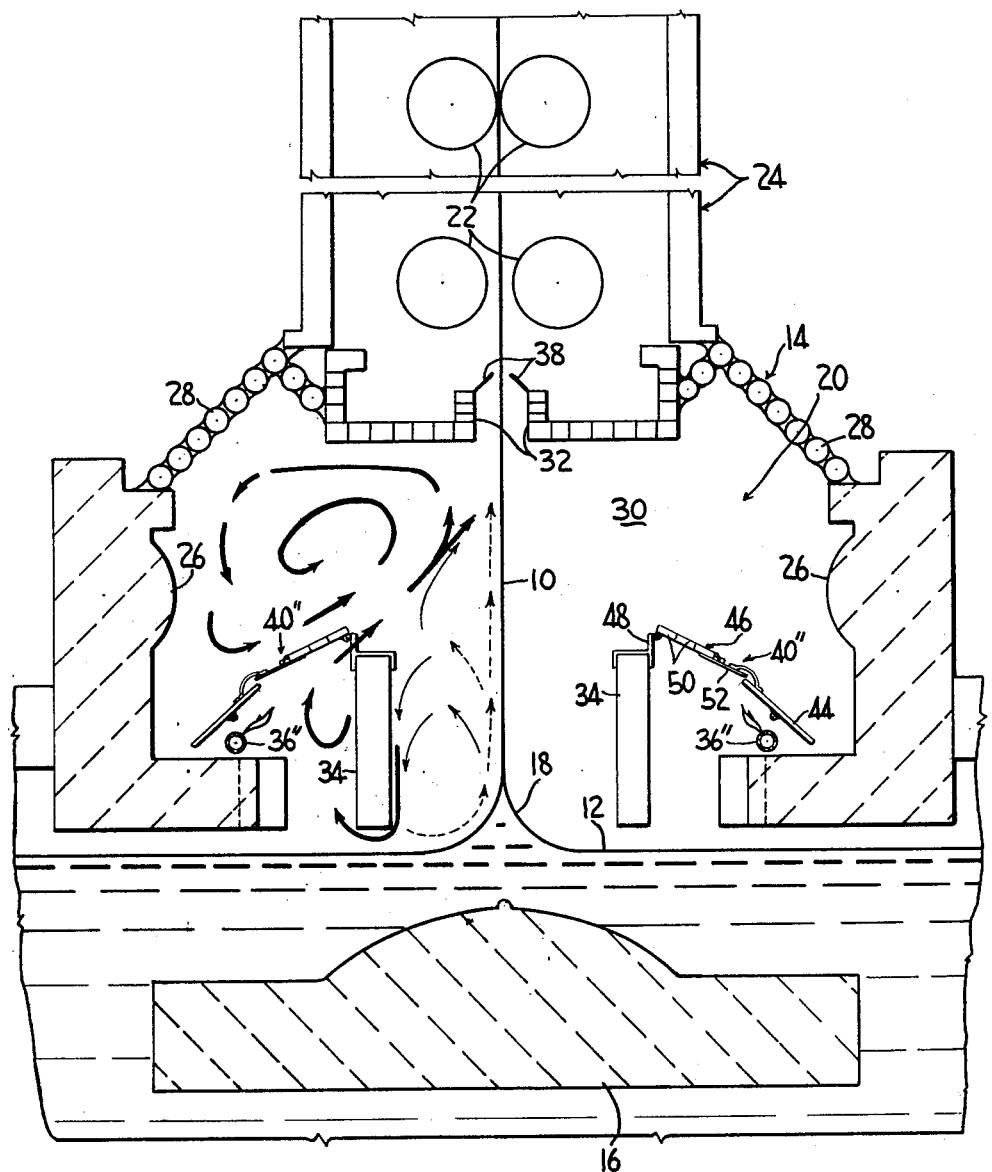
FIG. 4 shows diagrammatically still another embodiment of a drawing kiln according to this invention and the flow of principal air currents therein.

Looking now at FIG. 4 another embodiment of the invention is shown, in which the chimney plate, here identified as 40" is constructed of two parts 44 and 46. Part 44 is a solid plate and part 46 is partially water cooled. The part 44 is similar in construction to the plate 40' or FIG. 3 and the part 46 is hinged at one terminal and to spaced brackets 48 which frictionally engages the adjacent machine cooler 34. The brackets are so spaced to allow a channel between the part 46 and the machine cooler 34. The other end of the part 46 terminates closely adjacent to the part 44. To effectively seal the juncture between the parts 44 and 46, so as to prevent currents of air passing therebetween, there is preferably an asbestos member 49 secured to the part 46 and overlying the part 44, as illustrated. The asbestos members 49 extend substantially the width of the kiln, coextensive with the chimney plates 40". The part 46 includes a water cooled portion 50 constructed of hollow elements for the passage of cooling fluid, such as water and a solid plate portion 52. The cooled portion is disposed adjacent the machine cooler while the plate portion is adjacent the portion 44.

There are also burners 36" employed in this embodiment, which are similar in construction to the burners 36 and 36'. The burners 36" have their flames directed in the same general direction as the flames of the burners 36.

In each of the embodiments thus described, it is to be understood that the chimney plates extend substantially the width of the drawing chamber.

In FIGS. 1, 2, 3 and 4, inclusive, of the drawings, the directions of the principal air currents within the drawing chamber 20 are shown by arrows for the left-hand portion of chamber 20. It is not necessary to show the principal air currents to the right of sheet 10 because they are mirror images of those shown. Relatively high, intermediate, and relatively low velocity air currents are shown in heavy solid, light solid, and broken lines, respectively. In FIG. 1 the principal air currents for the normal drawing kiln arrangement are illustrated.

The temperature of glass sheet 10 in its travel through chamber 20 is substantially above the general air temperature within chamber 20, so that sheet 10 induces air to flow in the direction of its draw and along its faces. This air flow creates low pressure zones in the vicinity of each side of the base 18 of sheet 10. The currents of air along the faces of the sheet are those which form the natural stack effect. This layer of air along the sheet moves at a substantially greater velocity than the sheet. To supply this stack flow of air there must be a supply of air flowing to the low pressure zones. A primary source of this air is the drawing machine. That air enters chamber 20 between sheet 10 and catch pans 32 at a temperature below that of sheet 10 and flows past the catch pans 32, which are constructed as coolers, the ventilator coolers 28 and the L-blocks 26 between the end walls 30, all at relatively low temperatures, so that a zone on each side of sheet 10 and generally bound by catch pan cooler 32, ventilator cooler 28, L-block 26 and walls 30 become a secondary source of colder air. The temperature in this secondary zone will vary transversely thereof, being lower adjacent the end walls 30, so that air in different portions in this zone will also vary in temperature. Air from this zone flows to the low pressure zone at the base 18 on each side of sheet 10. The colder air from the secondary source flows downwardly and across the faces of coolers 34, being further chilled, and into the low pressure zone at the base of sheet 10, thereby providing a relatively large quantity of colder air, and, more importantly, moving at relatively high velocities of different magnitudes to the low pressure zones. This colder air of different temperatures and velocities transversely of chamber 20 disturbs non-uniformly the air traveling with the sheet, resulting in the formation of the usual characteristic longitudinal wave pattern extending in the direction of the draw. End-around currents of colder air also flow to the low pressure zones at the base 18 of sheet 10 and disturb the air flowing with the sheet in the direction of the draw, thus resulting in the diagonal wave pattern.

The kiln arrangement depicted in FIGS. 2, 3 and 4 include the use of means which act as barriers, diverters, and isolaters and these are so located and positioned in the drawing kiln to reduce the flow, i.e., quantity and velocity, of air to the base of a glass sheet as it is being drawn, thereby eliminating or materially reducing the intensity of the usual characteristic wave pattern. For purposes of later description, a barrier is a physical obstruction placed in a flow stream thereby reducing its velocity; a diverter is a device which changes the direction of flow of a fluid; and an isolater is that which reduces or eliminates the quantity of fluid flowing into and/or out of a zone. The various pattern improvement devices employed in the kiln arrangements depicted in FIGS. 2, 3 and 4 primarily perform one of the described functions.

Looking at FIGS. 2, 3 and 4, the kiln arrangements include burners 36 or 36' or 36", dampers 38 and the chimney plates, 40 or 40' or 40" of this invention. The entry of air from a primary source, i.e., the drawing machine 24, is effectively prevented or materially reduced by dampers 38, so that the quantity of relatively colder air moving to chamber 20 is materially reduced, and it follows that the quantity of air moving out of chamber 20 is also materially reduced. Thus, the velocity of air moving out of chamber 20 is lowered.

The burners 36 shown as having their flames angularly directed with respect to the L-blocks 26 alter or divert the path of movement of air in the zone of the secondary source of air, giving a cyclic path to this air. The burners 36 also create zones of low pressure adjacent their locations, so that air from the vicinity of the coolers 34 is diverted into the cyclic path of the air in the zone of the secondary source. Thus, the direction of flow across the coolers 34' is altered. This altering and diversion of air by burners 36 reduces the quantity of air flowing to the base of the sheet 10. As a result the velocity of the layer of air moving in the direction of the draw from the base 18 is lessened.

With reduced flow of air in the direction of the draw, the effects of its non-uniformity in velocities and temperatures are diminished, leading to the elimination of the disturbance of the relatively thin surface film of air adjacent the sheet and the elimination or material reduction in the intensity of the wave pattern of the sheet.

The chimney plates 40 or 40' or 40'' serve to impede the flow of air in the cyclic path so that it does not impinge on the burner flames and periodically change their angularity. The chimney plates also give directionality to currents of air flowing to the low pressure zones created by the burners 36 or 36'.

Thus the catch pan dampers 38 primarily serve as barriers; the burners 36 primarily serve as diverters; and the chimney plates 40 or 40' or 40'' serve a dual function. They shift the relationship of the magnitudes of air currents within the kiln, both as to velocity and quantity, and they minimize the non-effective cyclic air currents attendant to use of the burners within the kiln, accentuating certain air currents, mainly those which affect the flow along the sheet. Each of the first two devices provide the other functions to a lesser degree as set forth in the James and Ward application.

Experience has shown that each and every sheet glass drawing kiln differs somewhat in operation, probably due to minor differences in dimensions, location of cracks, crevices or the like, location relative to the glass melting tank, etc.

Also, the angularity of the chimney plates and other elements and/or their spacing from the sheet may differ on opposite sides of the sheet to give optimum results. Therefore, the exact placement and settings of burners, dampers, baffle assemblies, etc., to give a particular result requires merely individual adjustment and positioning for each drawing kiln. One manner in arriving at the correct adjustment and positioning is by observing the air currents within the chamber. This may be accomplished by placing a smoke producing agent at various locations in the chamber. This procedure also allows the observer to compare, generally, the relative velocities of the air currents.

In the kiln arrangements, the burners 36 and the dampers 38 are preferably of the construction described in the aforesaid James and Ward application and are positioned and adjusted in the manner so disclosed therein.

Satisfactory operation has been accomplished with the chimney plates 40 adjusted to an angle 20 degrees from the vertical and the burners 36 adjusted so that their flames are directed at an angle of 20 degrees to 30 degrees from the vertical; the chimney plates 40' adjusted to an angle of 45 degrees from the vertical and the burners 36' adjusted so that their flames are directed at an angle of 10 degrees to 45 degrees from the vertical with approximately 2.5 inches flames; and the chimney plate part 44 adjusted to an angle of 15 degrees to 60 degrees from the vertical with the part 46 adjusted to an angle of 25 degrees from the horizontal and the burners 36'' adjusted so that their flames are adjusted at an angle of 45 degrees from the vertical.

It has been stated above that the appearance of a glass sheet is improved by the use of the present invention over that obtained using burners and catch pan dampers as suggested in the James and Ward application.

As to the appearance of the glass sheet drawn using the present invention compared with glass sheet drawn by using a conventional arrangement and arrangements using burners and catch pan dampers disclosed by James and Ward, a below described test is used for pattern reading. In this test a white screen is placed 25 feet from a light source comprising a 1000-watt bulb in an apertured box. A random selected substantially full width sample of glass sheet is cut into 5 equal parts across its width and each sample part is placed between the box and the screen with the direction of the draw of the sheet being horizontal. Each sample part is first titled to determine the area having the most pronounced wave pattern. The same is then placed parallel to the screen and moved slowly toward the screen while providing a slight up and down motion until the most pronounced wave shadow disappears. The distance from the screen to the sample part at this point of disappearance measured in inches is referred to as the disappearance reading. Thus disappearance readings are taken of the glass sheet at spaced intervals across its width.

The following tabulation sets forth the disappearance readings of samples of glass made using the kiln arrangement of FIG. 1, using the kiln arrangements of FIGS. 2, 3 and 4 and, for comparison, using the kiln arrangement of the James and Ward application incorporating burners and dampers. The average reading is an average of five readings and the high and low readings are the high and low readings, respectively, of five readings. High disappearance readings, such as 30 inches and above are indicative of glass of much improved appearance. However, because of the character of the described test, the resolution for such high readings is less precise than for lower readings. Therefore, readings of between 30 and 40 inches are given as 30+, and readings of over 40 inches are given as 40+.

Each arrangement listed below includes a cooler such as 34 or 34' and unless specifically stated, the construction of such cooler will be as illustrated in FIG. 1.

| Arrangement | Disappearance Readings (in Inches) | | |
|---|---|---|---|
| | Average | High | Low |
| 1. Prior Art (Fig. 1) | 8.4 | 12 | 6 |
| 2. Chimney plate 40 one side of sheet, Chimney plate 40' other side of sheet, burners 36 and 36', dampers 38 | 26.2 | 28.1 | 23.3 |
| 3. Chimney plates 40', burners 36', dampers 38' | 22.6 | 24 | 21.1 |
| 4. Chimney plates 40'', burners 36'', dampers 38', with asbestos curtain 49 | 29 | 30 | 25 |
| 5. Burners and dampers (James and Ward) | 17.2 | 19 | 15 |
| 6. Burners and dampers (James and Ward) | 18.2 | 22 | 15 |

Thus, there is indicated a material increase in the appearance of the sheet. Of interest is that using the arrangements described does not materially change the speed by which the sheet is drawn.

I claim:

1. In apparatus for drawing improved appearance sheet glass from a bath of molten glass which includes a drawing chamber including side and end walls with coolers spaced above the bath and on opposite sides of the path traversed by the sheet and means for controlling the air currents within the chamber which affect the appearance of the sheet including burners within the drawing chamber spaced above the bath and from the path traversed by the sheet on opposite sides thereof, forming a stream of hot gas on each side of the sheet in a lower region of said chamber at a location above the molten bath and spaced from each side surface of said sheet, said burners having openings providing flames which project generally in the direction of the draw, the improvement which comprises, an elongated plate-like member directing said streams upwardly in a direction which is offset horizontally away from said sheet, said elongated member extending lengthwise of said burner and opposite the openings therein and having a lower terminal edge positioned above the surface of said bath and below the level of the openings in a burner adjacent thereto and an upper terminal edge positioned just above the level of said burner openings, said elongated member having a plate-like side face extending between said terminal edges and being adjacent to and spaced from said burner adjacent thereto and extending in the same general direction as the flames from said burner openings.

2. Apparatus as recited in claim 1, wherein said burners extend substantially the width of the chamber and said elongated member is imperforate and coextensive with said burners, said member being angled in the same general direction as the burner flames.

3. An apparatus as recited in claim 1 wherein said elongated member is positioned between a cooler and said adjacent burner.

4. An apparatus as recited in claim 1 wherein said elongated member is positioned between said adjacent burner and a wall of said drawing chamber.

5. An apparatus as recited in claim 1 wherein said elongated member is imperforate and is pivotally supported in said drawing chamber about an axis coextensive with said adjacent burner.

References Cited in the file of this patent

UNITED STATES PATENTS

| | | |
|---|---|---|
| 2,278,328 | Magrini | Mar. 31, 1942 |
| 2,352,539 | Halbach et al. | June 27, 1944 |
| 2,598,894 | Drake | June 3, 1952 |
| 2,691,247 | Henry et al. | Oct. 12, 1954 |
| 2,693,052 | Brichard | Nov. 2, 1954 |

FOREIGN PATENTS

| | | |
|---|---|---|
| 768,741 | Great Britain | Feb. 20, 1957 |